United States Patent [19]
Speh et al.

[11] 3,876,708
[45] Apr. 8, 1975

[54] ORTHOCARBONIC ACID ESTERS

[75] Inventors: Peter Speh, Esslingen-Hegensberg; Willi Kantlehner, Aalen, both of Germany

[73] Assignee: Fluka AG Chemische Fabrik, Buchs S.G., Switzerland

[22] Filed: Oct. 30, 1972

[21] Appl. No.: 301,784

[30] Foreign Application Priority Data
Nov. 15, 1971  Switzerland...................... 16537/71

[52] U.S. Cl...... 260/611 R; 260/615 A; 260/613 R; 260/576
[51] Int. Cl............................................. C07c 43/32
[58] Field of Search............ 260/615 A, 611 R, 613, 260/576

[56] References Cited
OTHER PUBLICATIONS

Chem. Abs., 7th Col. Index (1962–1966), Subj. A–Amm., pg. 380 S.
Chiang et al., Chem. Abs., Vol. 61 (1964), 13169.
Post, Chemistry of Aliphatic Orthoesters (1943) page 20.

*Primary Examiner*—Bernard Helfin
*Attorney, Agent, or Firm*—Wallenstein, Spangenberg, Hattis & Strampel

[57] ABSTRACT

Orthocarbonic acid esters are prepared from 1 mole of trichloro acetonitrile and 4 moles of an alkali metal or alkaline earth metal salt of alcohols which contain at least one $\alpha$-hydrogen.

20 Claims, No Drawings

ORTHOCARBONIC ACID ESTERS

The present invention relates to a new method for the production of orthocarbonic acid esters of the general formula $$C(OR)_4 \qquad I$$

wherein R represents a saturated hydrocarbon residue, which may be substituted and wherein the carbon atom bound to the oxygen atom contains at least one hydrogen atom.

The saturated hydrocarbon residue which may be substituted, identified in the above formula I as R may be a straight chain or a branched alkyl residue, specifically, it may be one containing up to seven, preferably one to four, carbon atoms, such as methyl, ethyl, propyl, isopropyl, butyl, isobutyl, pentyl, isopentyl, neopentyl and the like. Cycloalkyl residues, particularly those containing three to eight carbon atoms and cycloalkyl alkyl residues, especially those containing four to 10 carbon atoms, may be represented by the symbol R. Cyclopropyl, cyclobutyl, cyclopentyl, cyclohexyl, cyclopropylmethyl, cyclohexylethyl and the like are examples of such residues. Residues in which the carbon atom bound to the oxygen atom shows no hydrogen atom, i.e., tertiary residues, such as tertiary butyl, however, are excluded according to the definition furnished initially. One or several of the hydrogen atoms in the residues identified by the symbol R may be replaced by a substituent. Examples for such substituents are alkoxy groups, such as methoxy, ethoxy and the like; aryloxy groups such as phenyloxy and the like; amino groups disubstituted by alkyl and/or aryl such as dimethylamino, diethylamino, N-methylanilino and the like.

The esters of formula I form part of a known class of compounds. However, within the scope of the present invention, the following compounds have been produced for the first time:

Orthocarbonic acid tetra-isopropyl ester
Orthocarbonic acid tetra-neopentyl ester
Orthocarbonic acid tetra-cyclohexyl ester These heretofore unknown compounds also are the subject of the present invention. They have chemical properties which are considerably different from those of previously known orthocarbonic acid esters. Thus, for example, the orthocarbonic acid tetra-isopropyl ester is markedly more stable towards hydrolysis than e.g. the corresponding tetra-ethyl ester. The said novel compounds are particularly useful, e.g. as alkylating agents because they can be used for introducing residues which cannot be easily introduced by known methods, e.g. by means of oxonium salts.

The literature describes some methods for the production of orthocarbonic acid esters, but all of them have some disadvantages or others. For example, none of these methods permits the introduction of residues branched in the alpha position, such as isopropyl. Moreover, according to some of these methods only quite specific esters can be produced. Other disadvantages of these methods of the prior art are starting materials with difficult accessibility, difficulties of operating on a large scale and the like.

In contrast to these methods described in literature, the method according to the invention allows for a very broad application, furnishes the desired final products in good yields and is easy to carry out.

The method comprises reacting an alkali metal or an alkaline earth metal salt of an alcohol of the general formula $$R-OH \qquad II$$

in which R has the above indicated significance, with trichloro acetonitrile.

It is expedient to effect the conversion of such an alcoholate with tricholoro acetonitrile in an organic solvent which is inert under the conditions of the reaction. Dipolar, aprotic solvents, like, for example, dimethylformamide, dimethylsulfoxide, acetonitrile, tetrahydrofuran, dimethoxyethane, sulfolane, hexamethylphosphoric acid triamide and the like are solvents appropriate for this purpose.

However, the use of the alcohol of formula II as a solvent, which corresponds to the alcoholate used as the reaction component, is advantageous. While pressure is not a critical factor, for reasons of expediency it is preferable to operate at normal pressure. Neither is the temperature a critical factor, but it is preferred to carry out the reaction at elevated temperature, which is of particular preference at the reflux temperature of the reaction mixture. Sodium and potassium are the preferred cations in the alcoholates used as reaction components.

The alcoholates are prepared according to known methods from the corresponding alcohols of formula II which in turn are known compounds or can be prepared in analogy to methods used in the preparation of known alcohols.

The end products of the method according to the invention, that is, the orthocarbonic acid esters of formula I, are valuable and multilaterally applicable intermediate products for the synthesis of the most diverse classes of compounds. For example, orthocarboxylic acid esters and ketals, respectively, can be produced from one mole of an orthocarbonic acid ester of formula I by conversion with one or two moles respectively, of a Grignard compound. OH-acid compounds, like phenols, carboxylic acids and the like can be etherified or esterified, respectively, by conversion with esters of formula I. Furthermore, orthocarbonic acid esters of formula I show synthetically usable reactions with enol ethers, styrenes, ammonia, amines, sulfonamides, certain organic phosphorous compounds etc. Moreover, they can be converted into other orthocarbonic esters by reesterification with appropriate alcohol compounds, for example, also into such kinds which are not directly obtainable according to the method of the invention.

The following example illustrates the method according to the invention. All temperatures are indicated in degrees centigrade (°C).

EXAMPLE 1 mole of freshly distilled trichloroacetonitrile is added dropwise to 4 moles alcoholate in about 700 ml of the corresponding alcohol under agitation and exclusion of moisture at a temperature ranging from about 30° to 80°. Upon completion of the addition the reaction mixture is heated to reflux for 3 hours, the precipitated salt is filtered off and the filtrate is fractionated via a Raschig column 40 cm high.

According to the foregoing procedure, the following compounds of formula I were produced.

Orthocarbonic acid tetramethyl ester, boiling point 113°; $n_D^{20}$ 1.3850

Orthocarbonic acid tetraethyl ester, boiling point 159°

Orthocarbonic acid tetra-n-propyl ester, boiling point 90°–93°/10 Torr; $n_D^{20}$ 1.3998

Orthocarbonic acid tetraisopropyl ester, boiling point 70°/10 Torr; $n_D^{20}$ 1.3933

Orthocarbonic acid tetra-n-butyl ester, boiling point 136°/10 Torr; $n_D^{20}$ 1.4206

Orthocarbonic acid tetraisobutyl ester, boiling point 61°–62°/$10^{-3}$ Torr; $n_D^{20}$ 1.4140

Orthocarbonic acid tetraisopentyl ester, boiling point 81°–82°/$10^{-4}$ Torr

Orthocarbonic acid tetraneopentyl ester, melting point 78°–79°

Orthocarbonic acid tetracyclohexyl ester, melting point 101°–103°

We claim:
1. Orthocarbonic acid-tetraisopropyl ester.
2. Orthocarbonic acid-tetraneopentyl ester.
3. Orthocarbonic acid-tetracyclohexyl ester.
4. A method for the production of orthocarbonic acid esters of the general formula

$$C(OR)_4 \qquad \text{I}$$

wherein R represents a saturated hydrocarbon residue, which may be substituted and wherein the carbon atom bound to the oxygen atom contains at least 1 hydrogen atom
which comprises reacting 4 moles of an alkali metal or an alkaline earth metal salt of an alcohol of the general formula $$R\text{—}OH \qquad \text{II}$$

in which R has the above indicated significance with 1 mole of trichloro acetonitrile at an elevated temperature.

5. A method according to claim 4, wherein the conversion is carried out in an organic solvent inert under the reaction conditions.

6. A method according to claim 5, wherein dimethylformamide, dimethylsulfoxide, acetonitrile, tetrahydrofuran, dimethoxyethane, sulfolane or hexamethylphosphoric acid triamide are used as solvents.

7. A method according to claim 4, wherein the conversion is carried out in the alcohol of formula II corresponding to the alcoholate used as a reaction component in claim 1.

8. A method according to claim 4, wherein sodium or potassium is the cation of the alcoholate used as a reaction component.

9. A method according to claim 4, wherein R represents an unsubstituted saturated hydrocarbon residue.

10. A method according to claim 9, wherein R represents methyl.

11. A method according to claim 9, wherein R represents ethyl.

12. A method according to claim 9, wherein R represents n-propyl.

13. A method according to claim 9, wherein R represents iso-propyl.

14. A method according to claim 9, wherein R represents n-butyl.

15. A method according to claim 9 wherein R represents iso-butyl.

16. A method according to claim 9, wherein R represents iso-pentyl.

17. A method according to claim 9, wherein R represents neo-pentyl.

18. A method according to claim 9, wherein R represents cyclohexyl.

19. A method according to claim 4, wherein the conversion is carried out under reflux temperature conditions.

20. A method according to claim 5, wherein the conversion is carried out under reflux temperature conditions.

* * * * *